(12) United States Patent
Nelson

(10) Patent No.: US 6,307,337 B1
(45) Date of Patent: Oct. 23, 2001

(54) BRUSHLESS DC MOTOR ASSEMBLY

(75) Inventor: Richard Nelson, Cassville, MO (US)

(73) Assignee: Fasco Industries, Inc., Chesterfield, MO (US)

( * ) Notice: Subject to any disclaimer, the term of this patent is extended or adjusted under 35 U.S.C. 154(b) by 0 days.

(21) Appl. No.: 09/442,679

(22) Filed: Nov. 18, 1999

Related U.S. Application Data

(62) Division of application No. 09/010,154, filed on Jan. 21, 1998.

(51) Int. Cl.$^7$ .................................................. H02K 23/00
(52) U.S. Cl. .................. 318/254; 318/286; 388/907.2
(58) Field of Search ........................ 318/254, 280, 318/281–2, 283–286, 432–434; 388/907.2, 804, 811, 819, 831

(56) References Cited

U.S. PATENT DOCUMENTS

| | | | |
|---|---|---|---|
| 3,024,377 | 3/1962 | Tupper | 310/172 |
| 3,604,961 | 9/1971 | Saldinger | 310/51 |
| 3,694,903 | 10/1972 | Deming | 29/596 |
| 3,778,897 | 12/1973 | Bock et al. | 29/609 |
| 3,983,621 | 10/1976 | Donahoo | 29/596 |
| 4,013,910 | 3/1977 | Deming | 310/211 |
| 4,134,035 | 1/1979 | Donahoo | 310/42 |
| 4,482,832 | 11/1984 | Minton | 310/216 |
| 4,633,110 | 12/1986 | Genco et al. | 310/71 |
| 4,638,201 | 1/1987 | Feigel | 310/216 |
| 4,707,910 | 11/1987 | Saeed | 29/596 |
| 4,769,567 | 9/1988 | Kurauchi et al. | 310/156 |
| 4,779,330 | 10/1988 | Genco et al. | 29/596 |
| 4,847,527 | 7/1989 | Dohogne | 310/218 |
| 4,910,420 | 3/1990 | Hoover et al. | 310/68 B |
| 5,086,245 | 2/1992 | Sieja et al. | 310/216 |
| 5,107,159 | 4/1992 | Kordik | 310/156 |
| 5,130,591 | 7/1992 | Sato | 310/172 |
| 5,173,628 | 12/1992 | Yoshida et al. | 310/71 |
| 5,258,697 | 11/1993 | Ford et al. | 318/498 |
| 5,461,270 | 10/1995 | Didier | 310/68 B |
| 5,495,155 | * 2/1996 | Juzswik et al. | 318/280 |
| 5,610,462 | 3/1997 | Takahashi | 310/90 |
| 5,619,086 | 4/1997 | Steiner | 310/259 |
| 5,627,424 | 5/1997 | Steiner | 310/258 |
| 5,666,035 | * 9/1997 | Basire et al. | 318/254 |
| 5,698,919 | 12/1997 | Obara | 310/90 |
| 5,747,908 | 5/1998 | Saneshige et al. | 310/91 |
| 5,796,204 | 8/1998 | Woo | 310/258 |
| 5,889,376 | * 3/1999 | Takatsuka et al. | 318/434 |

* cited by examiner

Primary Examiner—David S. Martin
(74) Attorney, Agent, or Firm—Andrus, Sceales, Starke & Sawall, LLP

(57) ABSTRACT

A brushless dc motor assembly including control electronics for allowing variable speed, user-controlled motor operation. The control electronics are connected to a control board which is mounted directly to the motor bearing bracket. Hall effect devices for providing rotor rotational position information to the electronics are connected directly to the control board and extend therefrom to a position adjacent the rotor. The electronics control current through the stator winding through a MOSFET H-bridge circuit in dependence of feedback signals from the hall effect devices, a user-controlled enable signal, a motor winding current limit signal, and an under voltage signal.

11 Claims, 7 Drawing Sheets

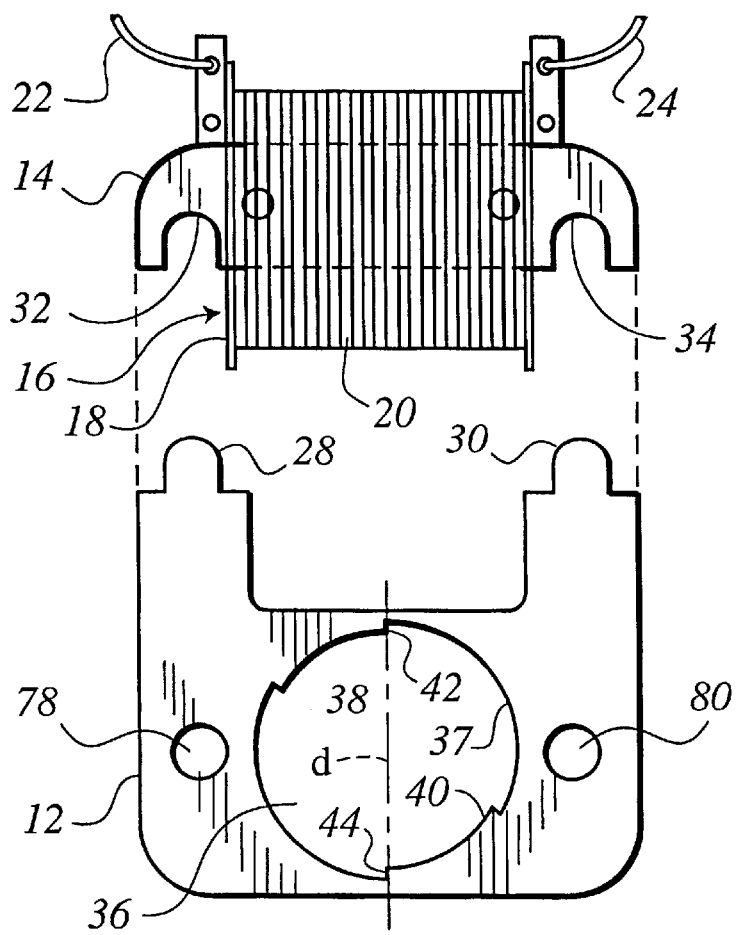
FIG. 3
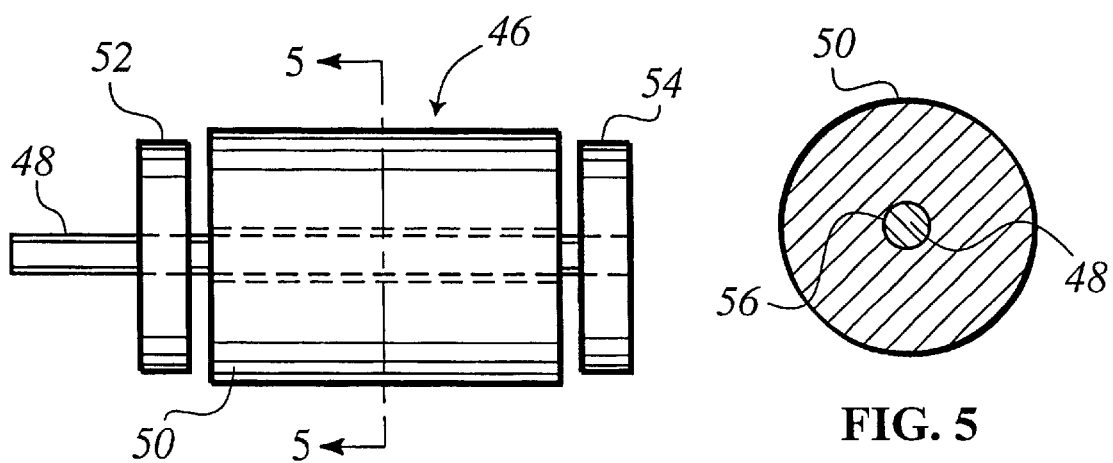
FIG. 4
FIG. 5

BRUSHLESS DC MOTOR ASSEMBLY

CROSS REFERENCE TO RELATED APPLICATION

This is a Divisional application of U.S. Ser. No. 09/010,154, filed Jan. 21, 1998, the contents of which are incorporated herein by reference.

FIELD OF THE INVENTION

The present invention relates to a dc motor assembly and, more particularly, to a compact and efficient brushless dc motor assembly.

BACKGROUND OF THE INVENTION

Permanent magnet brushless dc motors are widely used in a variety of applications due to their simplicity of design, high efficiency, and low noise. These motors operate by electronic commutation of stator windings rather than the conventional mechanical commutation accomplished by the pressing engagement of brushes against a rotating commutator. To achieve electronic commutation, brushless dc motor designs usually include an electronic controller for controlling the excitation of the stator winding(s). Advantageously, electronic commutation allows for specific, user-controlled motor operating characteristics.

Given the relative simplicity of design for permanent magnet brushless dc motors, however, prior art designs have failed to satisfactorily achieve a reliable design which may be produced at a minimized cost. For example, prior art brushless dc motor designs generally control motor operating characteristics using relatively complicated microprocessor-based electronics. Incorporation of a microprocessor into the control board is expensive and time-consuming from a production standpoint. In addition, the more components that are incorporated into the control electronics, the more likely it is that operational malfunctions will occur as a result of damaged or improperly installed electronics.

Also, elaborate mounting mechanisms have been developed in the prior art for mounting hall effect sensors adjacent the rotor to sense rotor rotational position. The hall effect sensors are typically connected to the control board via separate wires to provide a feedback signal for controlling motor operation through the electronics. Typically, the electronics are also mounted to the assembly using a separate bracket or other mechanism which further complicates and adds costs to the production process.

Accordingly, there is a long-felt need in the art for a brushless dc motor which is capable of achieving user-controlled operating characteristics, and which is efficient, compact, and cost-effective.

OBJECTS OF THE INVENTION

Accordingly, it is an object of the present invention is to provide a brushless dc motor having control electronics for allowing variable speed, user-controlled motor operation in an efficient, cost-effective, and reliable design.

Yet another object of the invention is to provide a permanent magnet, brushless dc motor having control electronics mounted to a control board, wherein the control board is secured directly to a bearing bracket of the motor for eliminating cumbersome manufacturing steps and reducing the size of the motor assembly.

Yet another object of the invention is to provide a permanent magnet, brushless dc motor having control electronics mounted to a control board which is secured directly to a bearing bracket of the motor, wherein hall devices are mounted directly to the control board in a position adjacent the rotor to eliminate the need for a separate mounting mechanism for the hall devices and reduce the size of the motor assembly.

Another object of the present invention is to provide a reliable and efficient brushless dc motor which may be efficiently manufactured, thereby reducing the consumer cost of such motors.

These and other objects of the present invention will become apparent from a review of the description provided below.

SUMMARY OF THE INVENTION

The present invention is organized about the concept of providing an efficient, reliable brushless dc motor which is of a simple and cost-efficient design. The motor includes control electronics for allowing variable speed, user-controlled motor operation. The control electronics are connected to a control board which is mounted directly to the motor bearing bracket. Hall devices for providing rotor rotational position information to the electronics are connected directly to the control board and extend therefrom to a position adjacent the rotor.

Specifically, the brushless dc motor of the present invention includes: a stator assembly having a stator winding thereon and a rotor opening formed therein; and a control board having control electronics connected thereto for receiving an electrical input and establishing current in the stator winding for generating a rotating magnetic field in the stator assembly. A rotor assembly of the motor has a rotor shaft, a rotor core fixed to the rotor shaft, and first and second bearings secured to the rotor shaft on opposite sides of the rotor core. The rotor core is disposed at least partially within the rotor opening in the stator with the first and second bearings positioned on opposite sides of the stator assembly.

A bearing bracket assembly secures the rotor in position relative the stator assembly, provides bearing surfaces for the bearings, and provides means for mounting the control board. The bearing bracket assembly includes a first bearing bracket for receiving the first bearing and a second bearing bracket for receiving the second bearing. The first and second bearing brackets each have at least one bore formed therein which aligns with a corresponding bore formed through the stator assembly. At least one fastener passes through the at least one bore in the first bearing bracket, the corresponding bore in the stator assembly, and the at least one bore in the second bearing bracket. The fastener thereby secures the first and second bearing brackets to the stator assembly with the first and second bearings received at least partially within the first and second bearing brackets, respectively.

The control board has at least one bore therein which aligns with the at least one bore in the second bearing bracket. Advantageously, the fastener extends through the second bearing bracket and through the at least one bore in the control board for securing the control board to the bearing bracket assembly. With this construction, the control board may be efficiently assembled to the motor assembly without the need for a separate mounting bracket or other mechanism.

Also, the control electronics include at least one hall effect device, and preferably two hall effect devices. The hall effect device has leads connected (soldered) directly to the control board and a sensor portion for establishing an output on at least one of the leads which is representative of a rotational position of the rotor core. Advantageously, no separate mounting mechanism for the hall effect device(s) is necessary since the hall device(s) extends directly from the control board toward the rotor core so that the sensor portion is positioned adjacent the rotor core. Where two hall effect devices are used, as in the preferred embodiment, they are secured to the control board so that the sensor portions thereof are positioned adjacent the rotor core at approximately 180 degrees apart relative to the circumference of the rotor opening.

In the preferred embodiment, production efficiency is also achieved by forming the rotor-core as a single-piece, permanent magnet. Preferably, the rotor core is cylindrical with a central bore formed therein. The rotor core is secured to the shaft with the shaft extending through the central bore. Also, in the preferred embodiment, operating efficiency is achieved by forming a pair of radially inward extending teeth on an inner surface of the rotor opening at approximately 180 degrees apart. The teeth form magnetic poles on the stator which provide starting orientation of the permanent magnet rotor assembly relative to the hall effect devices and cause a magnetic attraction during motor operation.

Also, in the preferred embodiment, the motor assembly is formed as a C-frame motor having a C-frame portion, an I-bar portion, and a bobbin around which the stator winding is formed. The I-bar portion extends through a central opening in the bobbin and is secured to the C-frame portion to complete the stator assembly. Although a C-frame motor construction is preferred, the features and advantages of the invention could be used in connection with other stator constructions.

The control electronics provide open-loop, variable speed control in a cost-efficient design. As discussed above, the control electronics preferably include first and second hall effect devices for sensing a rotational position of the rotor. The hall effect devices provide first and second feedback signals, respectively, to the control board representative of the rotational position. The control electronics are connected to the stator winding to form an H-bridge circuit for establishing the current in the stator winding in dependence of the electrical input and a user-controlled enable input to the control board.

The H-bridge includes first and second pairs of driving elements having conducting and non-conducting states. The first pair of driving elements are connected in the control electronics to be in a conducting state to conduct a first current through the winding when the first feedback signal and the enable signal are high. The second pair of driving elements are connected in the control electronics to be in a conducting state to conduct a second current through the winding when the second feedback signal and the enable signal are high. Bi-directional current flow is established in the stator winding since the first current is in a direction through the winding which is opposite from the direction of the second current.

The control electronics also include electronics thereon for establishing a dc bus voltage from the electric power source. The driving elements in the H-bridge circuit use the dc bus voltage as a supply voltage. To ensure proper operation of the driving elements, i.e. preferably power MOSFETs, an under voltage circuit is provided. The under voltage circuit establishes an under voltage feedback signal representative of the magnitude of the dc bus voltage. The under voltage feedback signal is connected in the electronics so that the first pair of driving elements are in a conducting state to conduct the first current through the winding when the under voltage feedback signal, the first feedback signal and the enable signal are high, and the second pair of driving elements are in a conducting state to conduct the second current through the winding when the under voltage feedback signal, the second feedback signal, and the enable signal are high.

Also, to ensure that the motor current does not exceed acceptable values a current limit circuit is provided for establishing a current limit signal representative of the magnitude of the current through the stator winding. The current limit signal is connected in the electronics so that the first pair of driving elements are in a conducting state to conduct the first current through the winding when the current limit signal, the first feedback signal and the enable signal are high, and the second pair of driving elements are in a conducting state to conduct the second current through the winding when the current limit signal, the second feedback signal and the enable signal are high.

Preferably, the first pair of drive elements in the H-bridge circuit comprise first and second solid state devices and the second pair of drive elements comprise third and fourth solid state devices. Each of the solid state devices, e.g power MOSFETs, has first and second terminals for conducting current when the device is in the conducting state and a third terminal for controlling the conductive state of the solid state device.

In the preferred H-bridge circuit, the first terminal of the first solid state device is connected to the first terminal of the fourth solid state device and to a first end of the motor winding. The first terminal of the third solid state device is connected to the first terminal of the second solid state device and to a second end of the motor winding. The second terminal of the first solid state device and the second terminal of the third solid state device are connected to the dc bus.

The enable input and the first feedback signal are connected as inputs to a first AND gate. An output of the first AND gate is connected for driving the third terminal of the fourth solid state device. The enable input and the second feedback signal are connected as inputs to a second AND gate. An output of the second AND gate is connected for driving the third terminal of the second solid state device. The first feedback signal is connected for driving the third terminal of the third solid state device and the second feedback signal is connected for driving the third terminal of the first solid state device. Preferably, the second and fourth solid state devices are N-channel MOSFETs, and the first and third solid state devices are P-channel MOSFETs.

In the preferred embodiment of the under voltage circuit, the under voltage feedback signal is provided as input to the first and second AND gates. The under voltage feedback signal is an output of an OPAMP comparator circuit which includes first and second voltage dividers connected between a voltage representative of the dc bus voltage, i.e. a dc supply voltage Vs, and ground. The first voltage divider includes a zener diode connected between a node of the first voltage divider and ground. A negative terminal of the OPAMP is connected to the node of the first voltage divider establishing a zener voltage at the negative terminal. The positive terminal of the OPAMP is connected to a node of the second voltage divider. The under voltage feedback signal thereby disables the first and second pairs of driving elements when the voltage at the node of the second voltage divider drops below the zener voltage.

Also, the preferred embodiment of the current limit circuit includes a current feedback circuit for providing a current limit feedback signal representative of the magnitude of the current through the stator winding as an input to an OPAMP comparator. The comparator compares a voltage level of the current limit feedback signal with a predetermined voltage level and providing output to a timer circuit. The timer circuit preferably includes an LM555 IC timer which receives the current limit feedback signal at its trigger input. The timer circuit provides a pulsed output to the first and second AND gates in dependence of the output from the comparator. The pulsed output of the timer circuit, i.e. the current limit signal, thereby pulses the first and second pairs of driving elements from an "on" to an "off" state when the current exceeds a predetermined level.

BRIEF DESCRIPTION OF THE DRAWING

A preferred embodiment of the invention is described below with reference to the following figures wherein like numerals represent like parts:

FIG. 3: is a top exploded view of a preferred stator assembly according to the invention.

FIG. 4: is a side view of a preferred rotor assembly according to the invention.

FIG. 5: is a sectional view of the rotor assembly shown in FIG. 4 taken along lines V—V.

DETAILED DESCRIPTION OF THE INVENTION

Figure 1:
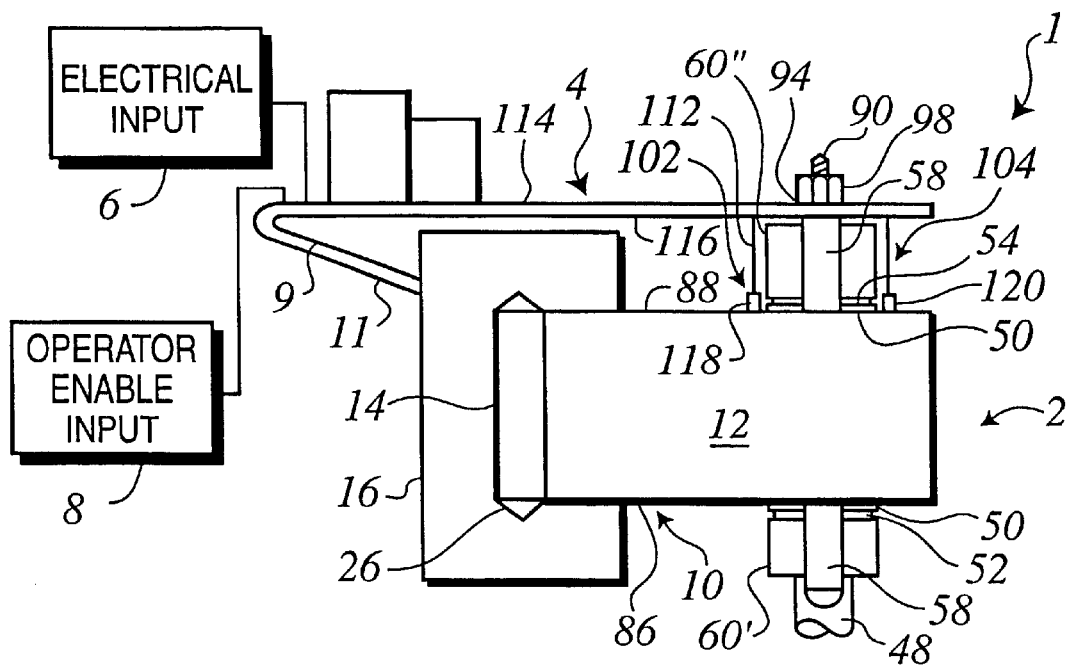
FIG. 1: is a side view of a brushless dc motor assembly according to the present invention.
Figure 2:
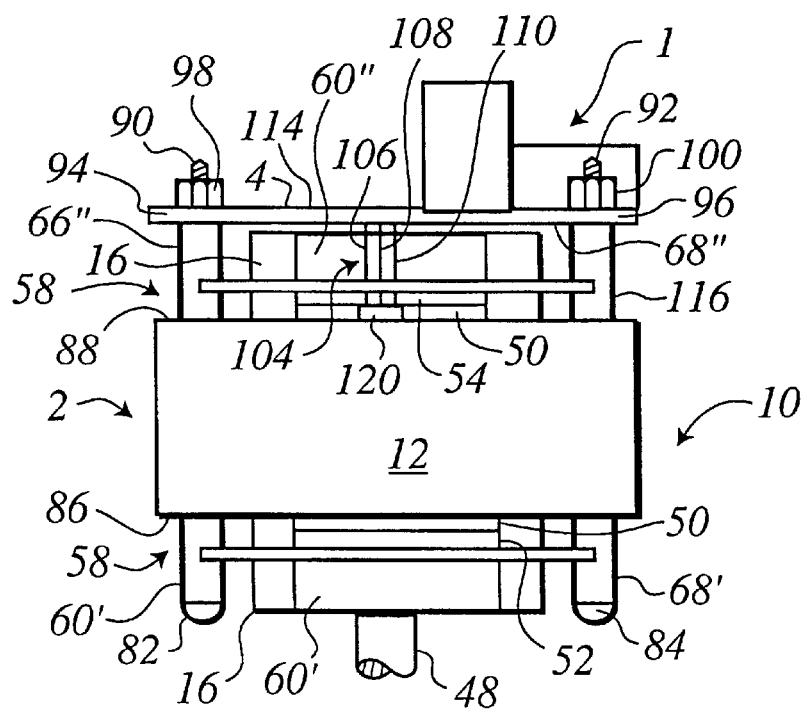
FIG. 2: is an end view the brushless dc motor assembly shown in FIG. 1.

With reference to FIGS. 1 and 2, a preferred embodiment of a motor assembly 1 according to the present invention will be described in general terms with a more detailed description to follow.

As shown, the main components of the assembly 1 are a C-frame brushless dc motor 2 and a control board 4 on which motor control electronics are mounted. The control board 4 receives an electrical input, e.g. 110 VAC and provides outputs 9,11 to the motor stator winding for operating the motor stator according desired operating characteristics. The control electronics control the output to the motor winding based on an operator enable input 8 and feedback signals representative of motor operation, as will be described in detail below.

As shown also in FIG. 3, the C-frame motor assembly 2 includes a stator 10 having a C-frame portion 12, and I-bar portion 14, and a coil assembly 16. The C-frame portion 12 and the I-bar portion 14 are made up of stacks of thin, steel laminations held together in intimate contact by welding, adhesive bonding, or rivets. The size and power of the motor 2 are determined in part by the number of laminations included in the stator.

The coil assembly 16 is made up of a plastic bobbin 18 with a specific number of turns of wire, i.e. a coil 20, wrapped around the bobbin. The size of the wire and the number of turns on the bobbin 18 are calculated to provide the desired performance characteristics of the motor. The wire forming the coil 20 can be made of any suitable conductor, such as copper or aluminum. The ends 22,24 of the wire are adapted for connection to the outputs of the control board so that the coil 20 may be energized by the control board outputs.

The stator 10 is formed by the combination of the C-frame portion 12, the I-bar portion 14, and the coil assembly 14. The I-bar portion is passed through a center opening 26 in the bobbin 18 so that the coil assembly 16 is roughly centered on the I-bar portion. The laminations of the C-frame portion define two spaced tabs 28,30 which are arranged to align with two corresponding spaced recesses 32,34, respectively, defined by the laminations of the I-bar portion 14. The I-bar portion with the coil assembly thereon is matted with the C-frame portion by press-fitting the tabs 28, 30 into the recesses 32,34.

As shown in FIG. 3, the laminations for the C-frame portion 12 of the stator 10 are preferably formed with a rotor opening 36 having radially inward extending teeth 38,40 defined on the interior surface 37 thereof. The teeth 38, 40 are positioned approximately 180 degrees apart and, in the preferred embodiment, have an edge 42, 44 adjacent the centerline d of the opening. The teeth define poles in the stator which facilitate desired initial alignment of a permanent magnet rotor positioned in the opening. In addition, during motor operation the teeth establish magnetic poles which magnetically attract the poles of the two-pole permanent magnet rotor. As will be described in detail below, the motor is operated by pulsing the output to the coil assembly "on" and "off" to thereby generate a pulsing, alternating magnetic flux in the stator. In general, the motor is pulsed by the control electronics based on signals received by hall effect devices as the poles of the rotor pass by the centerline d of the opening. During periods of motor operation when the motor windings are not energized or pulsed, the magnetic attraction caused by the radially inward extending teeth causes continued rotation of the rotor.

As shown particularly in FIGS. 4 and 5, the C-frame motor also includes a rotor assembly 46 which, in the preferred embodiment, includes a drive shaft 48, a two-pole permanent magnet 50 and ball bearings 52,54. According to the present invention, the permanent magnet 50 is formed as a single cylindrical piece with two magnetic poles using a high magnetic energy product, e.g. sintered ferrite, for maximum efficiency and power output at minimum cost. The magnet has a bore 56 therethrough for receiving the drive shaft 48. To assemble the magnet 50 to the shaft 48, the shaft is simply slip fit into the bore 56 in the magnet and bonded to the shaft using an adhesive. This greatly simplifies the production process for the rotor assembly, resulting in a production cost savings and, therefore, and overall lower consumer price for the motor.

Figure 6:
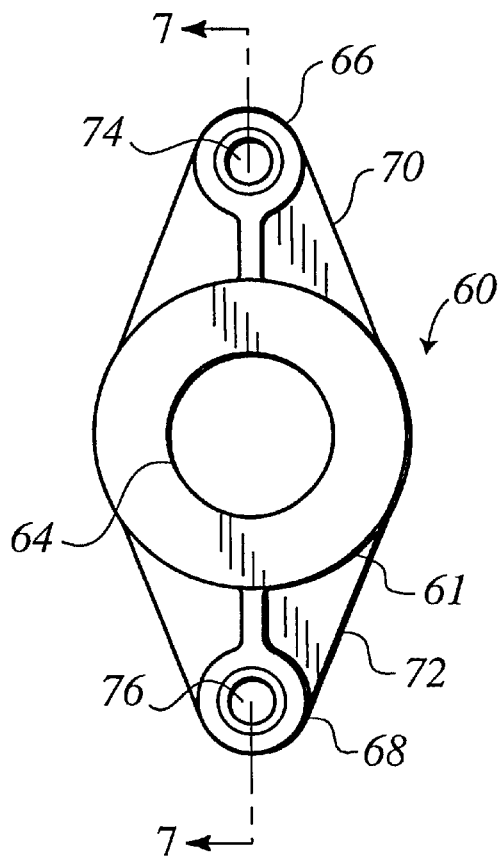
FIG. 6: is a top view of a preferred bearing bracket for a bearing bracket assembly according to the invention.
Figure 7:
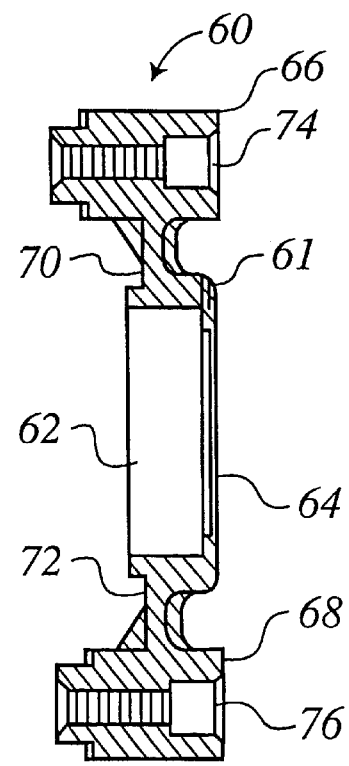
FIG. 7: is a sectional view of the bearing bracket shown in FIG. 6 taken along lines VII—VII.

Once the single piece magnet is secured to the shaft, the rotor is positioned in the opening 36 in the stator the ball bearings 52,54 are press fit onto the shaft adjacent the ends thereof. The rotor assembly is then secured into position relative to the stator assembly by a bearing bracket assembly 58. The bearing bracket assembly 58 includes a pair of bearing brackets 60 which are preferably cast and machined from aluminum or steel, as shown particularly in FIGS. 6–7. Each bearing bracket includes a body portion 61 with cylindrical opening 62 for receiving the sleeve 52, 54 bearings. A bearing bracket 60 is positioned over the bearing 52, 54 on each end of the shaft to securely receive the bearing within the opening 62 and provide a bearing surface. The bearing bracket further includes a bore 64 through which the shaft 48 passes at one end of the motor so that a mechanical device (not shown) may be attached to the shaft for rotation with the shaft. Mounting posts 66, 68 are attached to the body portion 61 by flanges 70,72 which extend radially from the body portion 61. Each mounting post 66,68 includes a bore 74,76 therethrough which correspond to and align with corresponding bores 78,80 (FIG. 3) through the C-frame portion of the stator.

To secure the bearing brackets and the rotor assembly 46 in position relative to the stator, a bracket 60' is positioned over the bearing 52 so that the bearing 52 is positioned in the opening 62 and the shaft is extending through bore 64. In this position the bottom of the mounting posts 66' and 68' are disposed against the bottom surface 86 of the C-frame stator portion 12. Likewise, the bearing bracket 60" is positioned over the bearing 54 and the mounting posts 66" and 68" of the bracket 60" rest against the top surface of the C-frame stator portion 12. Fasteners, e.g. bolts 82, 84, are then passed through the bores 74, 76 in the mounting post of the bracket 60', through the bores in the stator 78,80, and through the bores in the bracket 60" on the other side of the stator assembly.

The length of the bolts 82,84 is chosen so that their ends 90,92 extend outward from the bores 74, 76 in the bracket 60". The control board is secured to the motor assembly by positioning corresponding bores 94, 96 in the control board 4 over the ends 90,92 of the bolts. The ends of the bolts pass through the bores in the control board and threaded nuts 98,100 are secured to the ends of the bolts to secure the control board 4 against the bearing bracket 60". Advantageously, therefore, the control board is secured directly to the motor assembly using the same bolts which are used to secure the bearing brackets and rotor assembly in position relative to the stator assembly. Optionally, the control board may be protected by a cover (not shown) which may be snap-fit, screwed, or other wise secured to the control board. The cover protects the control board from direct physical contact, shorting of electrical paths, and dust.

Mounting the control board directly to the motor assembly greatly simplifies the production process for the assembly and eliminates components which would be used in the prior art for securing the control board to the assembly. In addition, the assembly with the control board mounted directly to the motor via the mounting bracket bolts 82,84, is compact in size relative to the prior art. As a result a compact motor assembly is achieved in a design which is cost-efficient to produce compared to the prior art.

Moreover, mounting of the control board 4 to the bearing bracket allows for direct mounting of the hall effect devices 102,104 to the control board 4 and, at the same time, proper positioning of the hall effect devices adjacent the rotor 46 for providing feedback signals representative the rotational position of the rotor. As shown in FIGS. 1–2, the preferred embodiment of the control board 4 includes two hall effect devices 102,104 for providing signals representative of rotor rotational position to the electronics on the board. The motor coil 20 is energized in dependence of the signals from the hall effect devices 102,104, as described in detail below.

In the preferred embodiment the leads of the hall devices, e.g. 106, 108, 110, 112 are soldered directly into the circuit formed on the control board for the electronics. Instead of being mounted to the top 114 of the control board as are the other solid state electronic devices, however, the hall devices 102, 104 are mounted to the bottom 116 of the board, and are positioned on the board 4 to extend downward with the hall device sensor portions 118, 120 disposed adjacent the permanent magnet 50 of the rotor assembly 48 at 180 degrees apart relative to the circumference of the permanent magnet 50.

Compared to the prior art where the hall devices are mounted adjacent the rotor with separate wires connecting the leads of the devices to the control board, several components and production steps are eliminated. In fact, since the hall device is mounted directly to the control board, no wires are necessary for connecting the device to the board. Also, no separate mounting mechanism for positioning the hall devices adjacent the rotor is necessary. Instead, the hall devices are merely soldered to the bottom of the board in positions which allow appropriate positioning of the hall sensors adjacent the permanent magnet 58 of the rotor 48 when the board is fixed to the mounting bracket via the bolts 82, 84.

Turning now to FIG. 9, there is shown a block diagram of the control board electronics 201. The operation of the control board electronics will be described, first in general terms, with a more detailed description to follow. It is to be understood, however, that although the embodiment of the control board electronics described herein includes various specific elements, e.g. resistors, MOSFETS, AND gates, etc., one skilled in the art could readily replace many of the elements with other solid state devices which would perform the same function. For example, one skilled in the art could readily substitute another transistor type for the MOSFETS described herein.

Figure 8:
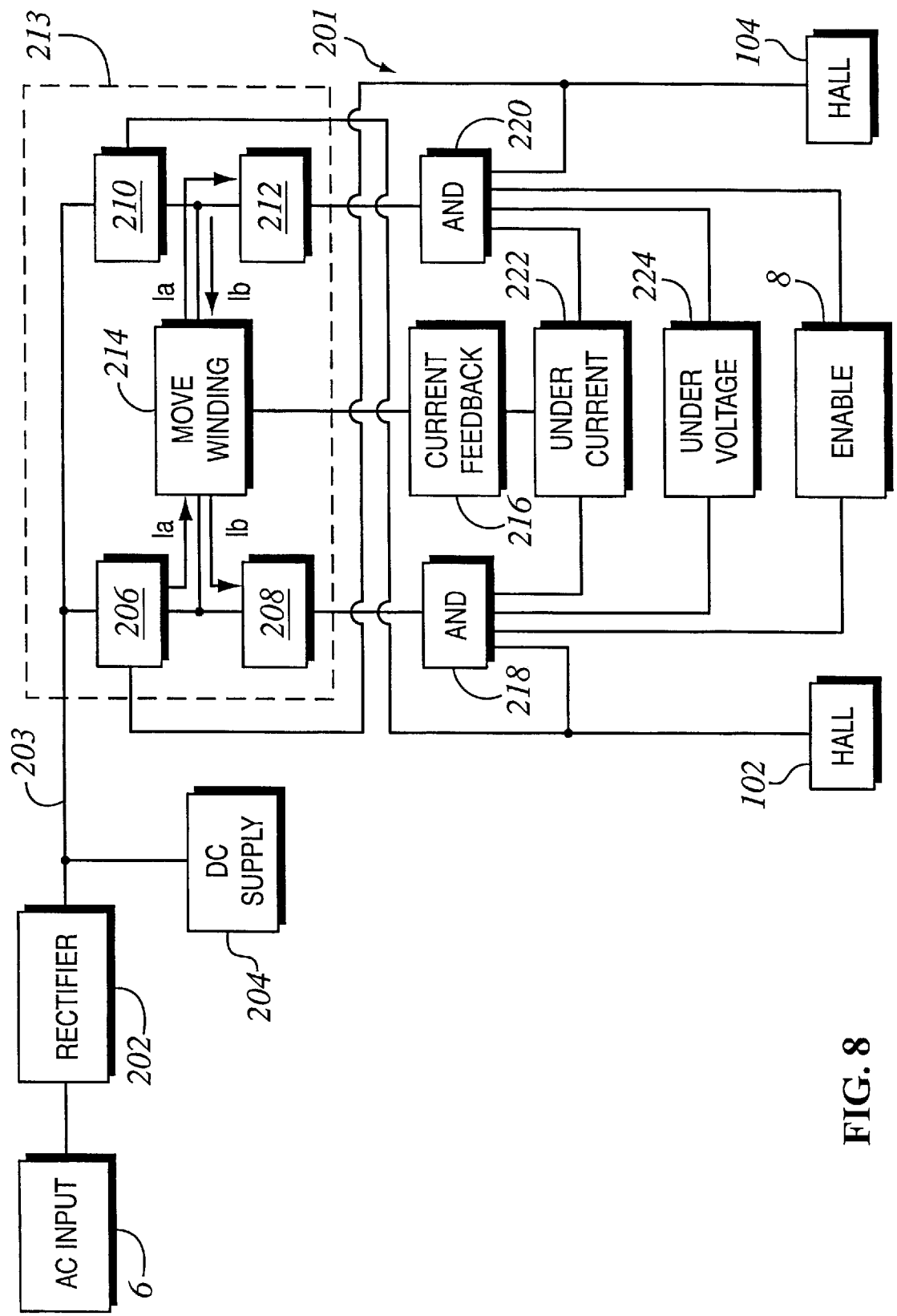
FIG. 8: is block diagram of a preferred embodiment of the control electronics according to the invention.

As shown in FIG. 8, the 115 VAC input 6 to the motor assembly passes to a rectifier assembly 202 which rectifies the AC input to 160 VDC. Ripple in the 160 VDC on the DC bus 203 may be filtered by a filtering network, e.g. a simple parallel connected capacitor. The filtered 160 VDC is provided to a DC supply 204 which creates and maintains a steady DC reference signal for operation of the controller electronics.

The 160 VDC is also provided as an input to an H-bridge drive circuit 213 which allows for bi-directional current flow to the single phase motor winding 214. The H-bridge drive circuit 213 includes a first pair of solid state drive elements 206,212, and a second pair of solid state drive elements 208, 210. When the motor is enabled, as will be described in more detail below, either only one of the pairs of drive elements is in a conducting or "on" state, or both pair of drive elements are in a non-conducting or "off" state. When the first drive elements 206,212 are conducting or "on", a current Ia is established through the motor winding 214. When the second pair of drive elements 208,210 are in a conducting or "on" state, a current Ib is established through the motor winding 214 in an opposite direction from Ia. By controlling the conductive states of the first and second pairs of drive-elements, therefore, bi-directional current flow is established through the motor winding for generating a rotating magnetic field in the stator core.

The conductive states of the drive elements are controlled primarily by outputs from a pair of AND gates 218, 220, and a pair of Hall effect sensors 102,104 which are positioned 180 degrees apart adjacent the circumference of the rotor. The outputs of a first AND gate 220 and a first hall effect device 104 control the conductive state of the first pair of drive elements 206, 212, and the outputs of a second AND gate 218 and a second hall device 102 control the conductive state of the second pair of drive elements 210, 208.

As is known, the Hall effect devices 102 and 104 provide an output which depends on the rotational position of the rotor. When the magnetic flux from the rotor is large enough and at the right polarity, the hall device output is active, e.g. active low. In the present invention, since the hall devices are positioned adjacent the rotor at positions which are 180 degrees apart, only one of the hall device outputs can be active at a given rotor position. At times, both hall device outputs are inactive.

To control the conductive state of the first pair of drive elements 206,212, the output of the first hall device 104 is connected to the first drive element 206 of the first pair of drive elements for causing the first drive element to go into a conductive state when the hall device output is active. The output of the hall device 104 is also provided as an input to the first AND gate 220 for controlling the output of the AND gate which is connected for controlling the conductive state of the second drive element 212 of the first pair of drive elements. Likewise, the output of the second hall device 102 is connected directly to the second AND gate 218 an a first drive element 210 of the second pair of drive elements 210, 208 for controlling the conductive states of the second pair of drive elements in dependence of the hall device 102 output.

A user-controlled enable signal 8, the output from under voltage detection circuitry 224, and the output from current limit detection circuitry 222 are also provided as inputs to the AND gates 218,220. The enable signal 8 allows user control of motor operation. The control electronics are connected to the stator winding 16 to form a H-bridge circuit 213 for establishing the current in the stator winding 16 in dependence of electrical input and a user-controllable enable input to the control board.

The under voltage circuitry 224 is connected for monitoring the voltage level on the DC bus 203. If the DC bus voltage is not at a preset level, then the motor will be disabled through the AND gates by the output of the under voltage circuitry 224. This arrangement is particularly important in the case where the drive elements of the H-bridge circuit 213 are power MOSFETS, as in the preferred embodiment described in detail below. If the DC bus voltage did not meet a certain minimum level, then the MOSFET drive elements would stop acting as a switch which can be turned "on" or "off" depending on the hall effect and the AND gate outputs. Instead, the MOSFETS would act as resistors, creating power dissipation which could destroy the MOSFETS. By monitoring the voltage level on the DC bus and conditioning the flow of current through the drive elements on the occurrence of an appropriate level, i.e. through use of the AND gates 118/220, the possibility of the MOSFETS generating destructive power dissipation is eliminated.

Likewise, the current limiting circuitry 222 is provided to ensure that the motor winding current does not exceed acceptable levels. Motor winding current is feedback through a feedback network 216 to the current limiting circuitry 222 which compares the motor current level with an acceptable level. If the motor winding current is above a predetermined acceptable level, then the motor is disabled through output of the current limiting circuit 222 to the AND gates.

Advantageously, therefore, the motor control electronics of the present invention provides efficient motor operation with user-controlled speed. In addition, the motor is enabled only when the DC bus voltage and the motor winding current are at acceptable levels. This prevents damage to the motor and ensures reliable motor operation in a simple and cost-effective design.

Figure 9A:
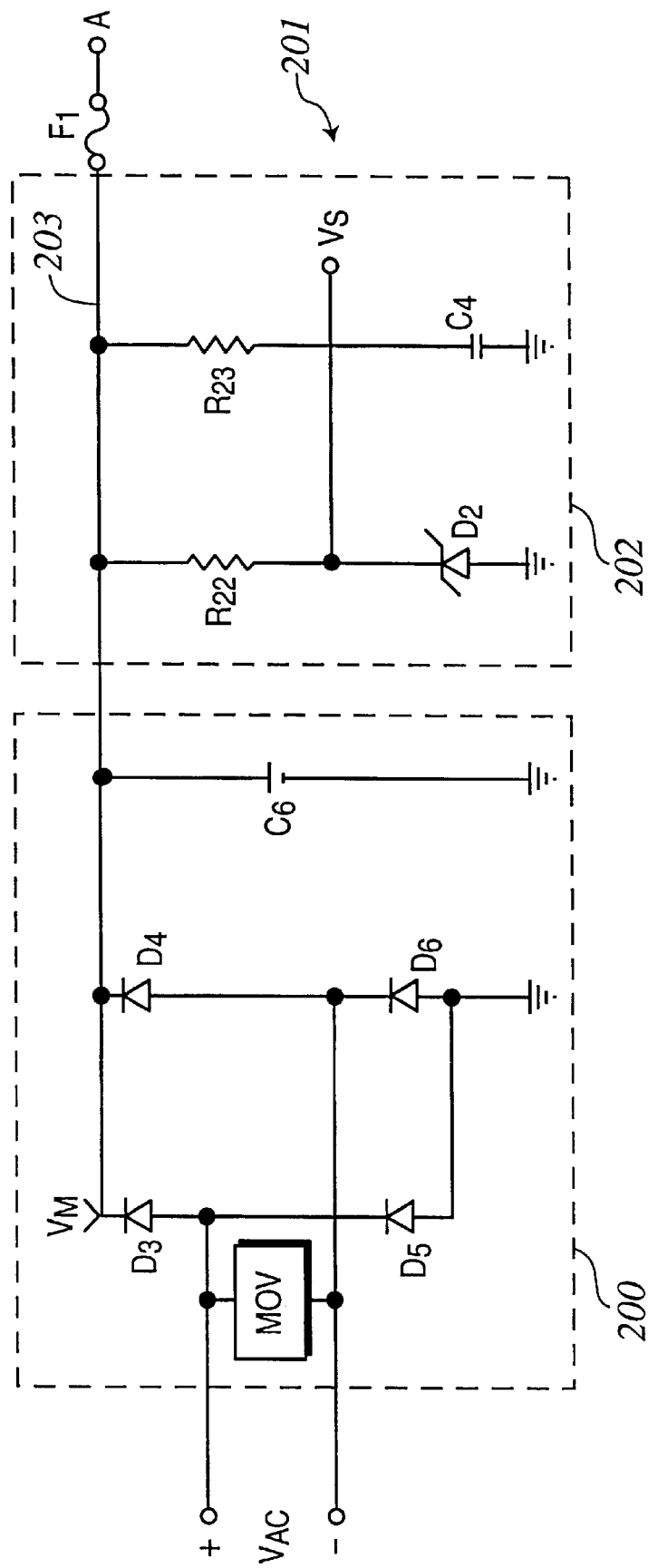
FIGS. 9A–9C: is a circuit diagram of a preferred embodiment of the control electronics according to the invention.
Figure 9B:
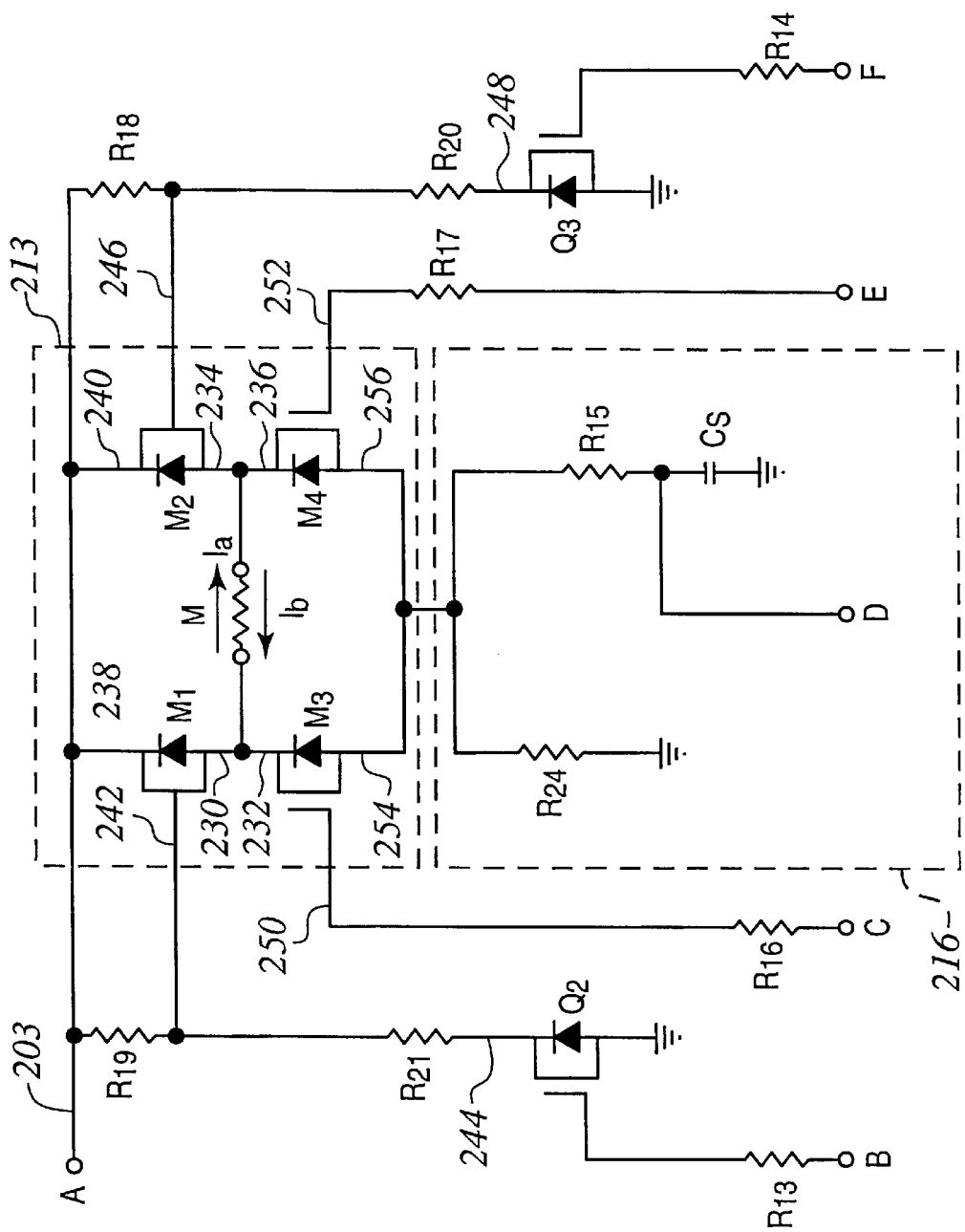
Figure 9C:
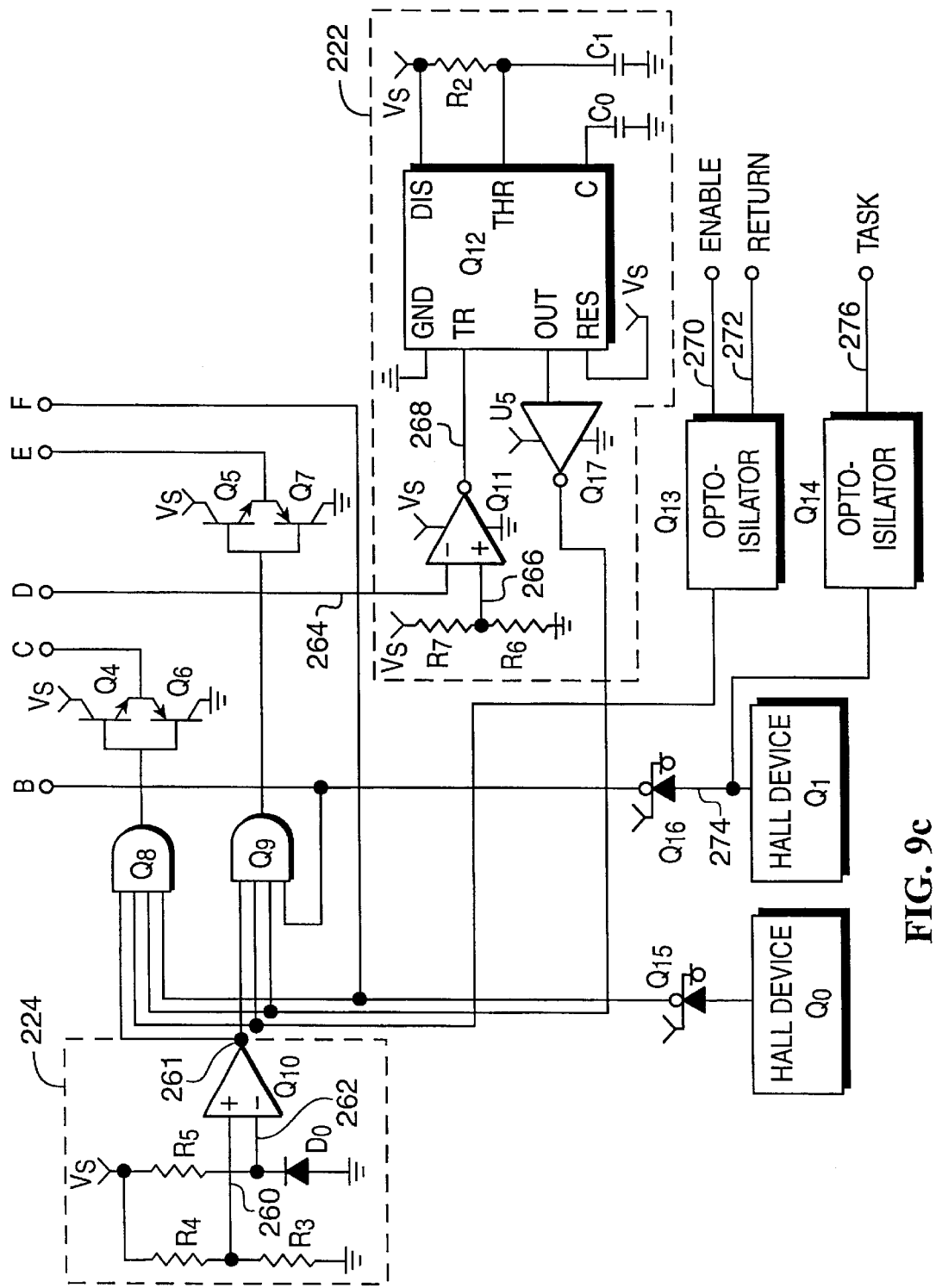

Turning now to FIGS. 9A–9C, there is shown a preferred embodiment of the control electronics 201 according to the invention. Although the control electronics 201 are shown having specific solid state electronic devices such as MOSFETS, pnp and npn transistors, AND gates, etc., it is to be understood that a wide variety of circuit elements could be chosen by those skilled in the art in order to achieve the advantages of the present invention. In addition, those skilled in the art will recognize that some elements could be removed, added, or substituted with other elements.

As shown in FIG. 9A, the AC input Vac is received into the control board 4 and rectified by a known ac-dc converter 200, preferably the combination of a Metal Oxide Varistor (MOV) and the diode bridge including D3,D4,D5, and D6. Ripple in the rectified AC is filtered by a known filter network, e.g. a parallel connected capacitor C6. The DC output of the rectifier is provided on the DC bus 203 to the H-bridge drive circuit 213 and the DC power supply 202.

The preferred DC supply 202 includes resistors R22 and R23 connected in parallel between the DC bus and the parallel combination of Zener diode D2 and capacitor C4. The DC output Vs is taken across the capacitor C4. The resistor R22 and R23 limit the current through the Zener diode which conducts to establish a relatively stable DC output Vs equal to the Zener voltage, e.g. 7.5 VDC. Including the Dc power supply 202 in the design of the control board eliminates the need for a step-down transformer as required in prior art designs. Also, since the Zener voltage is relatively constant when the Zener diode D2 is in conduction, the motor can be operated with wide variations in line (input) voltage without degrading the reference (output) voltage Vs.

The H-bridge drive circuit 213, as shown in FIG. 9B, comprises two P-Channel power MOSFETS, M1, M2, and two N-Channel power MOSFETS M3, M4. The source 230 of M1 is connected to the drain 232 of M3, and the source 234 of M2 is connected to the drain 236 of M4. The single phase motor winding M is connected from the source 230 of M1 to the source 234 of M2. The drain 238 of M1 and the drain 240 of M2 are connected to the DC bus 203, i.e. 160 VDC. The gate 242 of M1 is connected between R19 and R21 which are connected in series with the drain 244 of low power MOSFET Q2 across the DC bus. Likewise the gate of M2 is connected between R18 and R20 which are connected in series with the drain 248 of low power MOSFET Q3 across the DC bus. The source 254 of M3 and the source 256 of M4 are connected together and to a current feedback network 216 comprising R24, R15, and C5.

As discussed above, the H-bridge 213 facilitates bi-directional current flow through the motor winding M. A first pair M1, M4 of MOSFETS (drive elements) is connected for conducting current Ia to flow through the motor winding M. A second pair M2,M3 of MOSFETS (drive elements) is connected for causing current Ib, which is in the reverse direction from Ia, to flow through the motor winding M. This bi-directional current flow generates the rotating magnetic field necessary for motor operation.

The conductive state of the two MOSFET pairs is controlled by outputs from two AND gates Q8,Q9 and two hall devices Q0 and Q1, as shown in FIG. 9C. The output of AND gate Q8 is provided to a drive circuit comprising NPN transistor Q4 and PNP transistor Q6. Q4 and Q6 drive the MOSFET M3 through R16. M1, therefore, is in a conductive state when the output of AND gate Q8 is high. Likewise, the output of AND gate Q9 is provided to a drive circuit comprising NPN transistor Q5 and PNP transistor Q7. Q5 and Q7 drive the MOSFET M4 through R17. M4, therefore, is in a conductive state when the output of AND gate Q9 is high.

The outputs of the two hall devices Q0 and Q1 are inverted by inverters Q15, Q16 and provided as inputs to the AND gates Q8,Q9 respectively. The inverted output of hall device Q0 is connected for driving low power MOSFET Q3 through R14, and the inverted output of hall device Q1 is connected for driving low power MOSFET Q2. Q2 and Q3 conduct when the respective inverted hall device outputs are high. When Q2 conducts current flow is established through R19 and R21 to drive the base of M1, causing M1 to conduct. M2 conducts when Q3 conducts to establish current flow through R18 and R20. The conductive states of M1 and M2 are, therefore, dependent on the state of the inverted outputs of hall devices Q0 and Q1.

Accordingly, the current Ia is established through the motor winding M when the output of AND gate Q9 is high and the inverted output of hall device Q1 is high. In this case both M1 and M4 are in a conductive state, and both M2 and M3 are in a non-conductive state. The current Ib is established through the motor winding M when the output of the AND gate Q8 is high and the inverted output of Hall device Q0 is high. In this case both M2 and M3 are in a conductive state and both M1 and M4 are in a non-conductive state.

The output states of the AND gates are controlled by the inverted Hall device outputs, the under voltage circuit 224, the current limit circuit 222, and the user-controlled enable input. The under voltage circuit 224 monitors the DC supply and provides a low output to the AND gates in the event that the DC supply voltage falls below a predetermined level. As discussed above, this prevents excessive power dissipation by the MOSFETS. The under voltage circuit includes an OP AMP comparator Q10 having its positive terminal 260 connected between a voltage divider established by the series connection of R4 and R3 across the DC supply voltage Vs. The negative terminal 262 of the OP AMP Q10 is connected between a zener diode D0 and R5 which are also connected as a voltage divider in series across the DC supply Vs. The voltage level of the DC supply Vs is representative of the voltage on the DC bus. In the preferred embodiment, when the voltage at the positive terminal 260 drops below about 6.5 VDC, i.e. the Zener voltage of D0, then the output 261 of the under voltage circuit goes low, thus disabling the motor through AND gates Q8,Q9.

The current limiting circuit 222 uses motor winding current feedback from the current feedback circuit 216(FIG. 9B)and provides pulse width current limiting in the event that the motor winding current exceeds a predetermined level. The current limit circuit includes an OP AMP comparator Q11, and a LM555 IC timer Q12. The negative terminal 264 of the comparator is connected between R15 and C5 in the current feedback circuit 216 which includes R24, R15 and C5, and the positive terminal 266 is connected between R7 and R6 which are connected in series across the DC supply Vs to form a voltage divider. Under normal operating conditions the output 268 of the OP AMP Q11 is about 7.5 VDC in the preferred embodiment. When the predetermined current limit is exceeded, the OP AMP Q11 output goes low, i.e. to 0 VDC.

The OP AMP output 268 is connected to the trigger pin TR of the 555 Timer. The discharge pin DIS of the timer is connected to the DC Supply Vs and to the series combination R2 and C1, while the threshold pin THR is connected between R2 and C1. C0 is connected to the control input C for elimination of noise. The timer output pin OUT is inverted by inverter Q17 and provided as an input to the AND gates Q8,Q9.

When the OP AMP output 268 goes low on the occurrence of an over current condition, the 555 timer Q12 is excited to provide a pulsed output OUT with pulse width determined by the values of R2 and C1. In the preferred embodiment, the pulse with is approximately 50 ms. The pulsed output is inverted by inverter Q17 and provided to the AND gates Q8,Q9, causing the AND gate output to pulse the motor "on" and "off". When the motor current drops to an acceptable level the output of the OP AMP Q11 goes high, i.e. about 7.5 V, disabling the pulsed output OUT from the timer.

The enable input 270,272 allows user control of motor operation and speed. Speed is controlled by the duty cycle of the enable input at a maximum frequency of 300 Hz in the preferred embodiment. A pulse width modulated enable signal is used to control noise, minimize current draw, and maximize power output. As shown, in the preferred embodiment, and opto-isolator Q13 is provided at the enable input to electrically isolate the enable input. Finally, the output 274 of hall device Q1 is provided through an opto-isolator Q14 to a user interface to provided one pulse per revolution tachometer output 276 that can be used to monitor and control motor speed.

The conductive states of M3 and M4 are therefore controlled by AND gates Q8,Q9, the enable signal 270,272, the current limit circuit 222, the hall devices Q0,Q1, and the under voltage circuit 224. Thus the motor may be continuously enabled only when the DC bus voltage and the motor winding current are at appropriate levels. The conductive states of M1 and M2 are controlled directly by the outputs from the hall devices Q0,Q1.

In operation, the motor runs by the pulse width modulated enable signal 270,272 going high to turn on M1 and M4, causing current Ia to circulate through the motor windings until the inverted output of the hall device Q1 goes low as a result of the rotational position of the rotor. When the inverted output of hall device Q1 goes low, M1 and M4 are turned "off". The rotor continues to rotate, however, due to the two teeth 38,40 (FIG.3) in the stator which cause a magnetic attraction torque between the permanent magnet rotor and the stator. When the inverted output from hall device Q0 goes high, M2 and M3 turn "on" and current Ib is circulated through the motor winding M in an opposite direction to the current previously established by M1 and M4. When the inverted output from hall device Q0 goes low, M2 and M3 are turned "off". As long as an enable signal is provided at the enable input and the DC bus voltage and motor winding currents are at acceptable levels, the motor continues to run through the pulsing of the inverted hall device outputs caused by the rotation of the rotor past the hall devices. The two teeth on the stator assist motor rotation by causing a magnetic attraction torque between the stator and permanent magnet rotor during periods when neither of the inverted hall device outputs is high. The table below provides a summary of the device states versus permanent magnet rotor rotational position as indicated by the inverted outputs of the hall devices Q0 and Q1.

| | | | | |
|---|---|---|---|---|
| Q0 Inverted Hall Device Output | High | Low | Low | Low |
| Q1 Inverted Hall Device Output | Low | Low | High | Low |
| M1 | Off | Off | On | Off |
| M2 | On | Off | Off | Off |
| M3 | On | Off | Off | Off |

-continued

| | | | | |
|---|---|---|---|---|
| M4 | Off | Off | On | Off |
| Motor Current | | Positive | | Negative |
| Winding Back EMF | | Positive | | Negative |
| Motor Torque | | Positive | | Positive |

There is thus provided an efficient, reliable brushless dc motor assembly which is of a simple and cost-efficient design. The assembly includes control electronics for allowing variable speed, user-controlled motor operation. The control electronics are connected to a control board which is mounted directly to the motor bearing bracket. Hall devices for providing rotor rotation position information to the electronics are connected directly to the control board and extend therefrom to a position adjacent the rotor. The electronics control current through the stator winding through a MOSFET H-bridge circuit in dependence of feedback signals from the hall effect devices, a user-controlled enable signal, a motor winding current limit signal, and an under voltage signal.

The embodiments which have been described herein, however, are but some of the several which utilize this invention and are set forth here by way of illustration but not of limitation. For example, a wide variety of discrete and integrated circuit components could be used in the design to achieve the advantages of the invention. It is obvious that many other embodiments, which will be readily apparent to those skilled in the art, may be made without departing materially from the spirit and scope of this invention.

What is claimed is:

1. A brushless dc motor comprising:

a stator assembly having a stator winding thereon and a rotor opening formed therein;

a rotor assembly having a rotor shaft, a rotor core fixed to said rotor shaft, and first and second bearings secured to said rotor shaft on opposite sides of said rotor core, said rotor core being disposed at least partially within said rotor opening with said first and second bearings positioned on opposite sides of said stator assembly; and a control board having control electronics connected thereto for receiving an electrical input and establishing current in said stator winding for generating a rotating magnetic field in said stator assembly;

wherein said control electronics include first and second hall effect devices for sensing a rotational position of said rotor and providing first and second feedback signals, respectively, to said control board representative of said rotational position, and wherein said control electronics are connected to said stator winding to form an H-bridge circuit for establishing said current in said stator winding in dependence of said electrical input and a user-controlled enable input to said control board, said H-bridge circuit comprising first and second pairs of driving elements having conducting and non-conducting states, said first pair of driving elements being in a conducting state to conduct a first current through said winding when said first feedback signal and said enable signal are high, and said second pair of driving elements being in a conducting state to conduct a second current through said winding when said second feedback signal and said enable signal are high, said first current being in a direction through said winding which is opposite from the direction of said second current.

2. A brushless dc motor assembly according to claim 1, wherein said control electronics further include:

electronics for establishing a dc bus voltage from said electric power source; and an under voltage circuit for providing an under voltage feedback signal representative of the magnitude of said dc bus voltage, wherein said first pair of driving elements are in a conducting state to conduct said first current through said winding when said under voltage feedback signal, said first feedback signal and said enable signal are high, and said second pair of driving elements being in a conducting state to conduct said second current through said winding when said under voltage feedback signal, said second feedback signal, and said enable signal are high.

3. A brushless dc motor assembly according to claim 2 wherein said electronics further include:

a current limit circuit for establishing an undercurrent signal representative of the magnitude of said bi-directional current through said stator winding, wherein said first pair of driving elements are in a conducting state to conduct said first current through said winding when said current limit signal, said first feedback signal and said enable signal are high, and said second pair of driving elements being in a conducting state to conduct said second current through said winding when said current limit signal, said second feedback signal and said enable signal are high.

4. A brushless dc motor assembly according to claim 1 wherein said electronics further include:

a current limit circuit for establishing an undercurrent signal representative of the magnitude of said bi-directional current through said stator winding, wherein said first pair of driving elements are in a conducting state to conduct said first current through said winding when said current limit signal, said first feedback signal and said enable signal are high, and said second pair of driving elements being in a conducting state to conduct said second current through said winding when said current limit signal, said second feedback signal and said enable signal are high.

5. A brushless dc motor assembly according to claim 1, wherein said control electronics further include, electronics for establishing a dc bus voltage on a dc bus from said electric power source, and wherein said first pair of drive elements comprise first and second solid state devices and said second pair of drive elements comprise third and fourth solid state devices, each of said solid state devices having first and second terminals for conducting current when said device is in said conducting state and a third terminal for controlling the conductive state of said solid state device, and wherein said first terminal of said first solid state device is connected to said first terminal of said fourth solid state device and to a first end of said motor winding, said first terminal of said third solid state device is connected to said first terminal of said second solid state device and to a second end of said motor winding, said second terminal of said first solid state device and said second terminal of said third solid state device are connected to said dc bus, and wherein said enable input and said first feedback signal are connected as inputs to a first AND gate, an output of said first AND gate being connected for driving said third terminal of said fourth solid state device, and wherein said enable input and said second feedback signal are connected as inputs to a second AND gate, an output of said second AND gate being connected for driving said third terminal of said second solid state device, and wherein said first feedback signal is connected for driving said third terminal of said third solid state device and said second feedback signal is connected for driving said third terminal of said first solid state device.

6. A brushless dc motor assembly according to claim 5, wherein said first, second, third, and fourth solid state devices are MOSFETs.

7. A brushless dc motor assembly according to claim 6, wherein said second and said fourth solid state devices are N-channel MOSFETs and said first and third solid state devices are P-channel MOSFETs.

8. A brushless dc motor assembly according to claim 1, wherein said control electronics further include:

an under voltage circuit for providing an under voltage feedback signal representative of the magnitude of said dc bus voltage as an input to said first and second AND gates;

wherein said under voltage feedback signal is an output of a comparator circuit, said comparator circuit comprising first and second voltage dividers connected between a voltage representative of said dc bus voltage and ground, said first voltage divider including a zener diode connected between a node of said first voltage divider and ground; and an OPAMP, a negative terminal of said OPAMP being connected to said node of said first voltage divider establishing a zener voltage at said negative terminal, and said positive terminal being connected to a node of said second voltage divider, said under voltage feedback signal thereby disabling said first and second pairs of driving elements when said voltage at said node of said second voltage divider drops below said zener voltage.

9. A brushless dc motor assembly according to claim 8, wherein said electronics further include:

a current feedback circuit for providing a current limit feedback signal representative of the magnitude of said bi-directional current through said stator winding as an input to an OPAMP comparator for comparing a voltage level of said current limit feedback signal with a predetermined voltage level and providing output to a timer circuit, said timer circuit providing a pulsed output to said first and second AND gates in dependence of said output from said comparator, said pulsed output of said timer circuit thereby pulsing said first and second pairs of driving elements from an "on" to an "off" state when said bi-directional current exceeds a predetermined level.

10. A brushless dc motor assembly according to claim 1, wherein said electronics further include:

a current feedback circuit for providing a current limit feedback signal representative of the magnitude of said bi-directional current through said stator winding as an input to an OPAMP comparator for comparing a voltage level of said current limit feedback signal with a predetermined voltage level and providing output to a timer circuit, said timer circuit providing a pulsed output to said first and second AND gates in dependence of said output from said comparator, said pulsed output of said timer circuit thereby pulsing said first and second pairs of driving elements from an "on" to an "off" state when said bi-directional current exceeds a predetermined level.

11. A brushless dc motor assembly according to claim 10 wherein said timer circuit includes an LM555 IC timer, and wherein said comparator output is connected to a trigger input of said timer.

* * * * *